United States Patent
Motohashi et al.

(10) Patent No.: US 10,081,418 B2
(45) Date of Patent: Sep. 25, 2018

(54) PANEL MEMBER, AIRCRAFT MAIN WING, AND METHOD FOR FORMING PANEL MEMBER

(71) Applicant: Mitsubishi Aircraft Corporation, Aichi (JP)

(72) Inventors: Hideto Motohashi, Aichi (JP); Yoshifumi Hosokawa, Aichi (JP); Toshinari Fuji, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 184 days.

(21) Appl. No.: 14/792,103

(22) Filed: Jul. 6, 2015

(65) Prior Publication Data
US 2015/0307181 A1  Oct. 29, 2015

Related U.S. Application Data (62) Division of application No. 13/402,099, filed on Feb. 22, 2012, now abandoned.

(30) Foreign Application Priority Data

Feb. 24, 2011 (JP) ................................. 2011-038161

(51) Int. Cl.
*B64C 3/26* (2006.01)
(52) U.S. Cl.
CPC ............ *B64C 3/26* (2013.01); *Y10T 29/49622* (2015.01); *Y10T 428/12389* (2015.01); *Y10T 428/24479* (2015.01)

(58) Field of Classification Search
CPC ... B23P 2700/01; B23C 2215/04; B64C 3/26; B64C 3/20; B64C 3/182; B64C 3/185;
(Continued)

(56) References Cited

U.S. PATENT DOCUMENTS

| 2001/0015043 A1 | 8/2001 | Brenneis et al. |
| 2004/0035979 A1 | 2/2004 | McCoskey, Jr. et al. |

(Continued)

FOREIGN PATENT DOCUMENTS

| EP | 1 127 785 A2 | 8/2001 |
| JP | 2003191028 A | 7/2003 |

(Continued)

OTHER PUBLICATIONS

Extended European Search Report for counterpart application EP 12 15 1367; dated Jun. 18, 2012.
(Continued)

*Primary Examiner* — Christopher Besler
(74) *Attorney, Agent, or Firm* — Pearne & Gordon LLP (57) ABSTRACT

There is provided a panel member capable of restraining an increase in weight of a wing panel while restraining wasteful work in the manufacturing process, an aircraft main wing, and a method for forming the panel member. A wing panel 10 is formed with ridges 20 each having a dimension larger than the machining tolerance in the boundary portions between areas A1, A2, . . . . Therefore, the worker who handles the wing panel 10 can visually confirm the step portions of the areas A1, A2, . . . easily. Thereby, if a flaw or the like is found in the areas A1, A2, . . . , corrective actions can be properly taken on the actually existing flaw without mistaking the flaw for the step portion of the areas A1, A2, . . . .

20 Claims, 5 Drawing Sheets

(58) Field of Classification Search
CPC .. B64C 3/187; B64C 3/18; B64C 3/12; B29L 2031/3085
See application file for complete search history.

(56) References Cited

U.S. PATENT DOCUMENTS

| | | | |
|---|---|---|---|
| 2004/0101655 A1* | 5/2004 | Bryans | B21J 5/00 428/119 |
| 2008/0296433 A1 | 12/2008 | Brenner et al. | |
| 2011/0268926 A1 | 11/2011 | Dominguez et al. | |

FOREIGN PATENT DOCUMENTS

| | | |
|---|---|---|
| JP | 2004217208 A | 8/2004 |
| JP | 2010274910 A | 12/2010 |
| WO | 03-082670 A1 | 10/2003 |

OTHER PUBLICATIONS

Yamada, T.; Development of Shot Peen Forming Technology of Main Wing Integral Skin of Continental Business Jet. IN: Mitsubishi Heavy Industries Technical review, vol. 39, No. 1; 2002; pp. 36-39.
Japanese Office action for 2011-038161 dated Jan. 17, 2013.

* cited by examiner

PRIOR ART

PANEL MEMBER, AIRCRAFT MAIN WING, AND METHOD FOR FORMING PANEL MEMBER

This application is a Divisional of U.S. patent application Ser. No. 13/402,099 filed on Feb. 22, 2012, which is incorporated herein by reference in its entirety.

BACKGROUND OF THE INVENTION

Field of the Invention

The present invention relates to a panel member, an aircraft main wing, and a method for forming the panel member.

Description of the Related Art

For an aircraft main wing, the outer surface thereof is formed by a panel-form member (hereinafter, referred to as a wing panel). This wing panel is configured so that the thickness thereof is set according to the portion of the wing. That is, in the base end portion on the airframe side of main wing, and in the portion around the engine-mounting position, the thickness of wing panel is set so as to be large because high strength is required in these portions. In contrast, in the tip end portion of wing or the like portions, the thickness of wing panel is set so as to be small. Thus, the thickness of wing panel is prevented from being increased than necessary while a necessary strength is ensured depending on the respective portions, whereby the weight of wing panel is restrained.

Some wing panels are formed by being machined out of a metallic base material (for example, refer to Takeshi Yamada et al. "Development of Shot Peen Forming Technology of Main Wing Integral Skin of Continental Business Jet" Mitsubishi Heavy Industries Technical Review, Vol. 39, No. 1 (2002), p. 36).

For such a wing panel, to make the thickness thereof different according to the portions, generally, in a portion in which the thickness changes, the position of the cutting tool of a cutting machine with respect to the metallic base material is changed stepwise.

Figure 4:
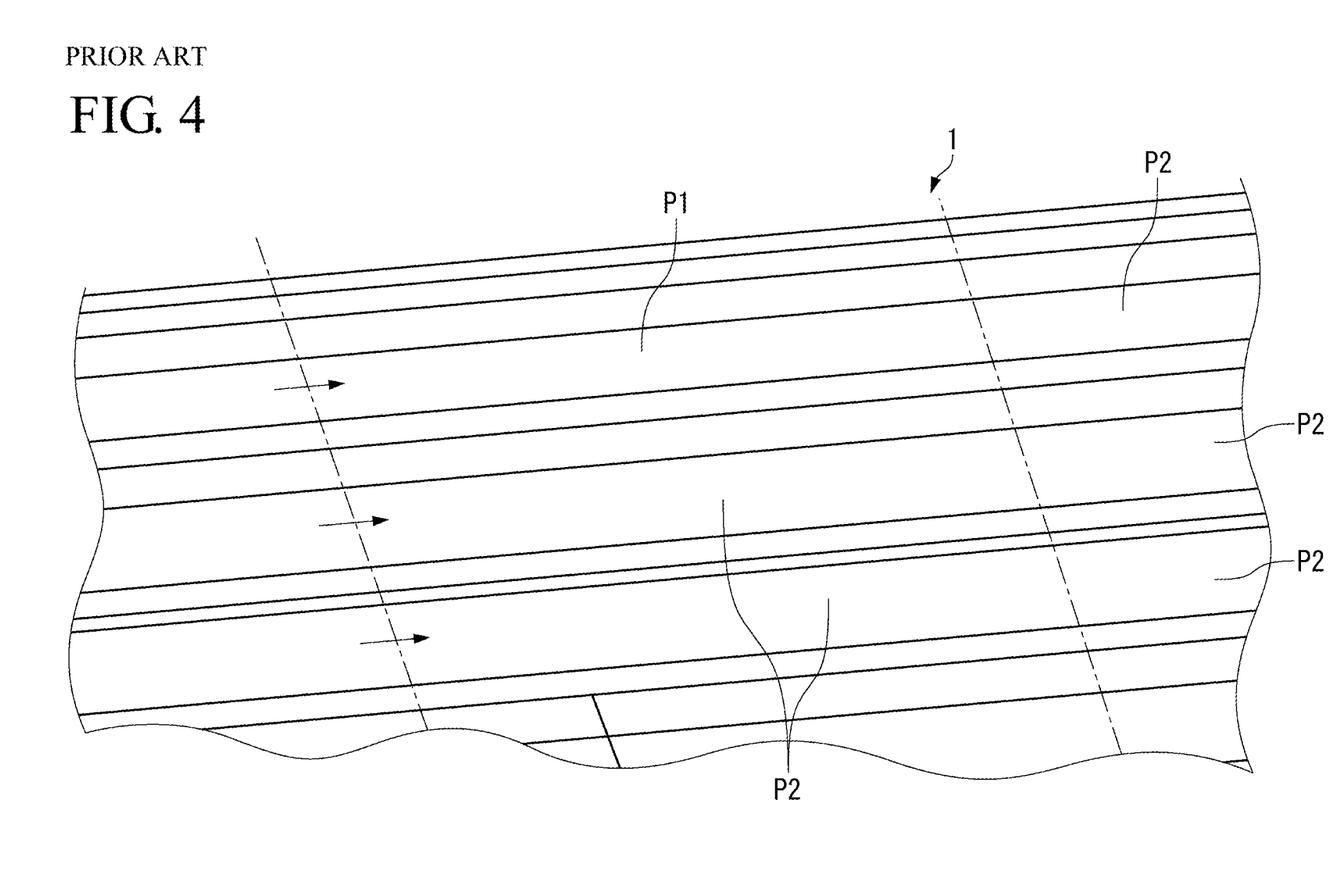
FIG. 4 is a perspective view showing a part of a conventional wing panel.
Figure 5:
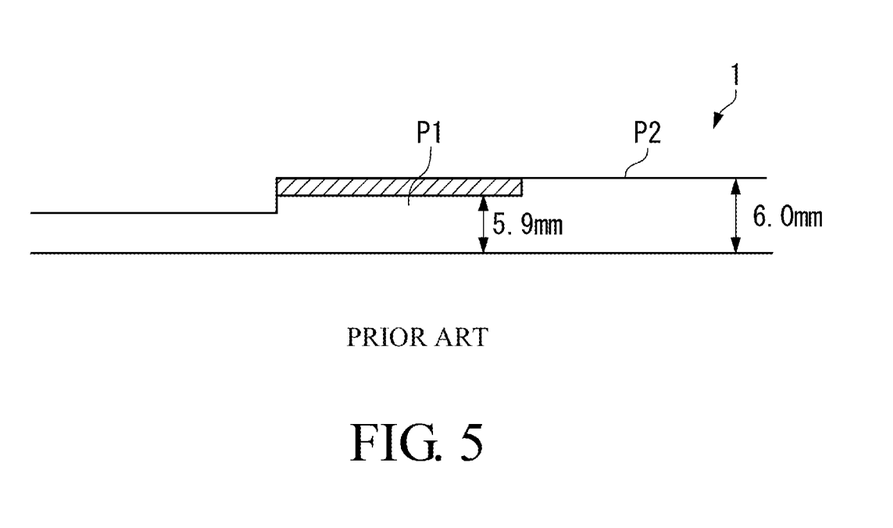
FIG. 5 is a sectional view of a conventional wing panel.

Unfortunately, in the case where the wing panel is machined out of a material, a machining tolerance exists depending on the capability or the like of the cutting machine. In the portion in which the thickness changes, the change amount of the thickness must be set to a dimension equal to or larger than the machining tolerance. In the case where the machining tolerance is, for example, ±0.1 mm, the thickness is preferably increased or decreased stepwise for each dimension equal to or larger than the machining tolerance, for example, for each dimension equal to or larger than 0.2 mm (this increasing/decreasing amount is referred to as a step amount as appropriate). That is, in the case where the design value of thickness in a certain portion P1 of a wing panel 1 is 6.0 mm as shown in FIGS. 4 and 5, the actual dimension after machining of the portion P1 is 6.0±0.1 mm=5.9 to 6.1 mm. In the case where the step amount of thickness in a portion P2 adjacent to the portion P1 is 0.1 mm, which is equal to the machining tolerance, the design value of thickness in the portion P2 is 6.1 mm, and the actual dimension after machining is 6.1±0.1 mm=6.0 to 6.2 mm.

In such a case, as shown in FIG. 5, although the thickness increases from the portion P1 to the portion P2 in design, actually, in some cases, the thickness does not change, or inversely the thickness decreases from the portion P1 to the portion P2. Even in such a case, no problem occurs in terms of strength as long as the thicknesses of the portions P1 and P2 are within the machining tolerance. However, a hindrance may occur in the manufacturing process.

At the site of manufacturing process, the wing panel machined out of a metallic base material by cutting machine is inspected at least visually. If a flaw or the like induced while machining is present on the wing panel, the surroundings of the flaw must be sanded to correct the flaw to the predefined standard or higher grade.

If the step amount of thickness is small, the step existing in the portion in which the thickness changes becomes a minor step, and therefore, at the inspection time, it is sometimes impossible to distinguish between a normal step and a flaw. For this reason, correction is sometimes made as the result of mistaking the normal step for a flaw, which leads to an increase in the manufacturing cost.

To overcome this problem, conventionally, by setting the step amount of thickness to a dimension larger than the machining tolerance as described above, measures have been taken such that a step formed in the portion in which the thickness changes can be checked visually with ease. Thereby, the correction is prevented from being made as the result of mistaking the normal step for a flaw, and thereby the increase in the manufacturing cost is restrained.

Unfortunately, if the step amount of thickness is made larger than the machining tolerance, a portion having a thickness larger than necessary is produced, which leads to an increase in weight of the wing panel. For example, in the above-described example, in the case where the step amount of thickness in the portion P2 adjacent to the portion P1 is made 0.4 mm, which is larger than the machining tolerance, the design value of thickness in the portion P2 becomes 6.4 mm, so that the actual dimension after machining becomes 6.4±0.1 mm=6.3 to 6.5 mm. Therefore, in the boundary portion between the portion P1 and the portion P2, a step of at least 0.1 mm arises. However, in the portion P2, assuming that the above-described thickness of 6.1 mm provides a necessary strength, the thickness design value of 6.4 mm is an excess value by 0.3 mm.

SUMMARY OF THE INVENTION

The present invention has been made to solve the above-described technical problems where, in order to visually check a step, it was necessary to set the step amount of thickness to a dimension larger than the machining tolerance, thus increasing a weight of the wing panel. Accordingly, an object thereof is to provide a panel member capable of restraining an increase in weight of a wing panel while restraining wasteful work in the manufacturing process, an aircraft main wing formed by the said panel member, and a method for forming a panel member.

To achieve the above object, the present invention provides a panel member forming the outer surface of an aircraft, wherein a portion of the panel member in which the thickness thereof changes gradually is divided into a plurality of areas each having a certain thickness; the thicknesses of the adjacent areas are different from each other; and in the boundary portion between the adjacent areas, there is formed a marking ridge having a height larger than the dimensional difference in thickness between the areas on both sides of the boundary portion. By this ridge, the boundary portion between the adjacent areas each having a different thickness can be visually confirmed easily.

Such a ridge is preferably formed so as to have a height larger than the machining tolerance of the panel member.

Also, the panel member is formed by being machined out of a metallic base material.

Such a panel member can also be used in forming a portion other than the outer surface of main wing.

Also, the present invention provides an aircraft main wing wherein the outer surface of the wing is formed by the panel member described above.

Further, the present invention provides a method for forming a panel member, in which the panel member is machined out of a metallic base material, wherein a portion in which the thickness changes gradually is divided into a plurality of areas; each of the areas is formed so as to have a certain thickness; and in the boundary portion between the adjacent areas, there is formed a ridge having a height larger than the dimensional difference in thickness between the areas on both sides of the boundary portion.

The present invention is not limited to the case where the panel member and stringers (reinforcing ribs) are integrally machined out of a thick plate, and can be applied to a so-called built-up panel in which the stringers are fastened to the panel member with fasteners as far as the panel member is machined out of a thick plate.

According to the present invention, in the boundary portion between the adjacent areas, there is formed the ridge having a height larger than the dimensional difference in thickness between the areas on both sides of the boundary portion. By this ridge, the boundary portion between the adjacent areas each having a different thickness can be visually confirmed easily. Thereby, only a portion in which a flaw occurs in each area can be corrected, so that wasteful work in the manufacturing process can be restrained. Also, the boundary portion between the adjacent areas can also be formed so as to have a thickness equal to or smaller than the machining tolerance, and thereby the increase in weight of the wing panel can be restrained.

DETAILED DESCRIPTION OF THE PREFERRED EMBODIMENT

The present invention will now be described in detail based on an embodiment shown in the accompanying drawings.

Figure 1:
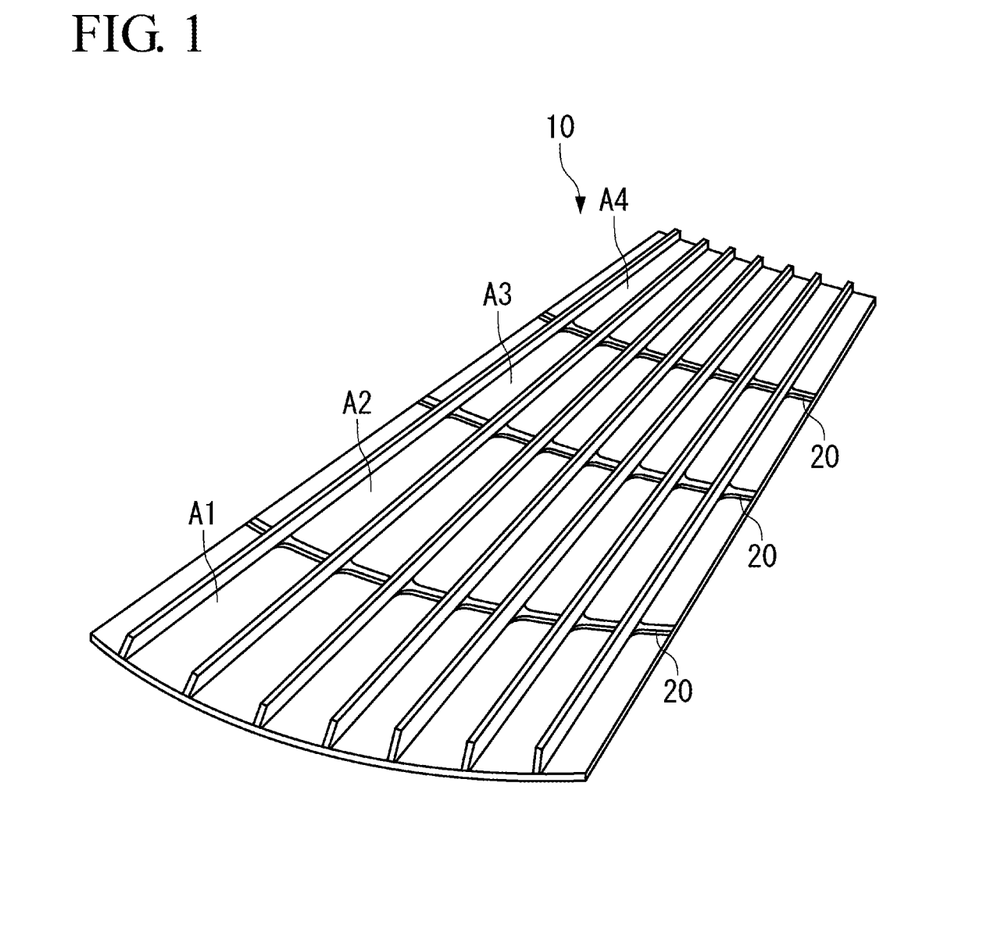
FIG. 1 is a perspective view showing a part of a wing panel in accordance with an embodiment of the present invention.

FIG. 1 is a perspective view for explaining a wing panel 10 in accordance with this embodiment.

As shown in FIG. 1, the wing panel 10 forms the outer surface of an aircraft main wing. The wing panel 10 is formed so as to have the necessary minimum thickness or a larger thickness depending on a portion of a main wing.

The wing panel 10 is formed by being machined out of a metallic base material.

Figure 2:
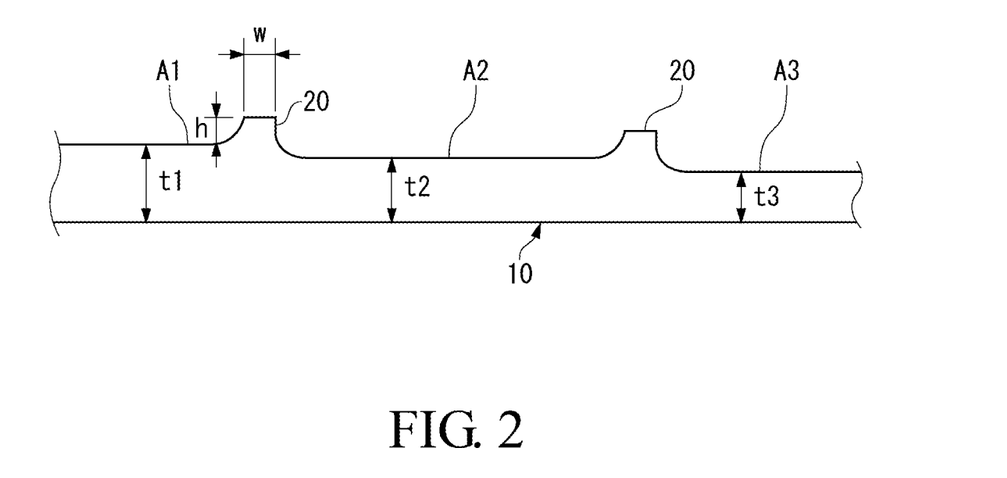
FIG. 2 is a sectional view of the wing panel shown in FIG. 1.

As shown in FIGS. 1 and 2, in a portion in which the thickness of the wing panel 10 changes, the thickness of the wing panel 10 is changed by dividing the wing panel 10 into a plurality of areas A1, A2, . . . and by gradually increasing or decreasing the thicknesses t1, t2, . . . of the areas A1, A2, . . . , respectively.

At this time, the change amounts of thicknesses of the adjacent areas (for example, area A1 and area A2, area A2 and area A3), that is, the difference between thickness t1 and thickness t2, the difference between thickness t2 and thickness t3, and so on are set so as to be a specified value s or larger.

The specified value s can be set optionally regardless of the machining tolerance set at the design time. That is, the specified value s can be made a dimension equal to or larger than the machining tolerance.

In the boundary portions in which the areas A1, A2, . . . adjoin each other, ridges 20 are formed so as to be continuous. This ridge 20 has a height h equal to or larger than the machining tolerance and a width w. For example, both of the height h and the width w can be set at about 1 mm.

According to the wing panel 10, since the ridges 20 each having a dimension larger than the machining tolerance are formed in the boundary portions of the areas A1, A2, . . . , the worker who handles the wing panel 10 can visually confirm the step portions of the areas A1, A2, . . . easily. Thereby, if a flaw or the like is found in the areas A1, A2, . . . , corrective actions can be properly taken on the actually existing flaw without mistaking the flaw for the step portion of the areas A1, A2, . . . .

Also, by doing this, a configuration can be provided in which no hindrance occurs even if the change amounts of thicknesses of the areas A1, A2, . . . (the difference between thickness t1 and thickness t2, the difference between thickness t2 and thickness t3) are equal to or smaller than the machining tolerance. Thereby, each of the thicknesses of the areas A1, A2, . . . can be made the necessary minimum thickness, and the wing panel 10 can be formed without having a wasteful thickness. Also, by forming the ridges 20 in the necessary minimum dimensions only when the change amounts of thicknesses of the areas A1, A2, . . . are equal to or smaller than the machining tolerance, the weight of the wing panel 10 is not increased, so that the weight thereof can be reduced as compared with the conventional configuration where, in order to visually check a step, it was necessary to set the step amount of thickness to a dimension larger than the machining tolerance, thus increasing a weight of the wing panel.

Further, the ridges 20 can be caused to function as a reinforcing element for the wing panel 10. Thereby, the thicknesses of the areas A1, A2, . . . are decreased further, so that the weight of the wing panel 10 can also be reduced.

Figure 3A:
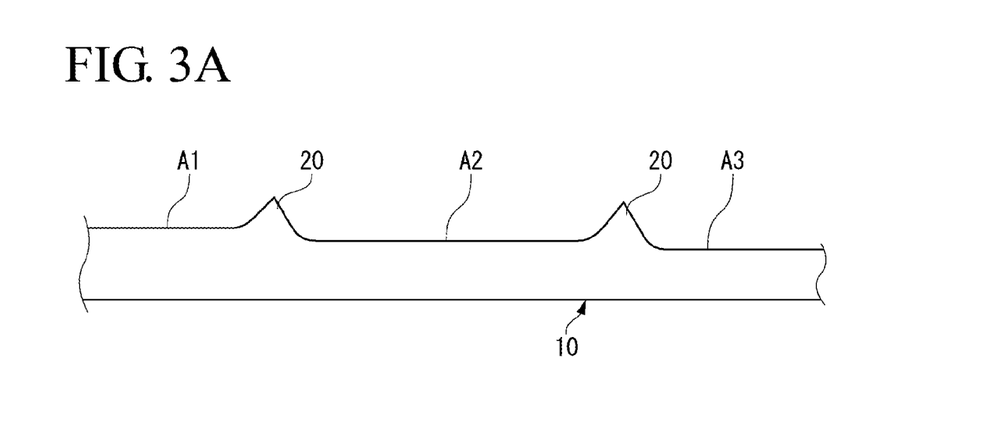
FIGS. 3A and 3B are sectional views showing other examples in which the cross-sectional shape of a ridge formed on a wing panel is different.
Figure 3B:
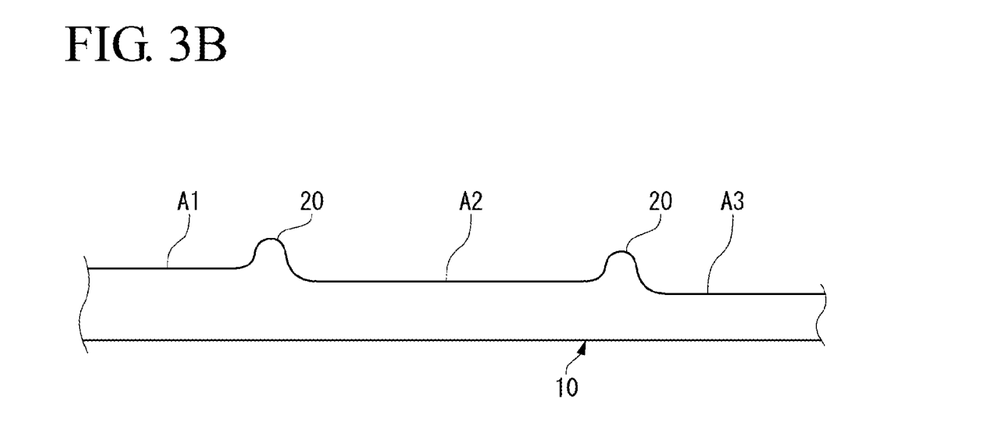

In the above-described embodiment, the ridge is formed into a rectangular shape in cross section. However, the ridge shape is not limited to this shape, and as shown in FIGS. 3A and 3B, the ridge can be formed into a triangular shape or an inverse U shape in cross section.

Besides, the configurations described in the above-described embodiment can be selected, or can be changed to other configurations as appropriate without departing from the spirit and scope of the present invention.

What is claimed is:

1. A method of manufacturing a metallic base material to form a panel member of an aircraft, the metallic base material having:
   a first area with a first thickness that is constant across the first area,
   a second area adjacent to the first area with a first boundary portion between the first area and the second area, the second area having a second thickness that is different from the first thickness and constant across the second area, the method comprising the steps of:

determining the first thickness of the first area and the second thickness of the second area and determining a difference between the first thickness and the second thickness;

comparing the difference between the first thickness and the second thickness to a machining tolerance of the panel member;

forming the first area;

forming the second area; and forming a first marking ridge in the first boundary portion only when the difference between the first thickness of the first area and the second thickness of the second area is less than or equal to the machining tolerance of the panel member, the first marking ridge protruding above first area and the second area.

2. The method of manufacturing the metallic base material according to claim 1, wherein the panel member forms an outer surface of a wing of an aircraft.

3. The method of manufacturing the metallic base material according to claim 1, wherein a height of the first marking ridge is greater than the machining tolerance.

4. The method of manufacturing the metallic base material according to claim 1, wherein a height of the first marking ridge is a sufficient height necessary to visually confirm the first boundary portion.

5. The method of manufacturing the metallic base material according to claim 1, wherein a height of the first marking ridge is greater than the machining tolerance and is a sufficient height necessary to visually confirm the first boundary portion.

6. The method of manufacturing the metallic base material according to claim 1, a height of the first marking ridge is equal to the machining tolerance.

7. The method of manufacturing the metallic base material according to claim 6, wherein the panel member forms an outer surface of a wing of the aircraft.

8. The method of manufacturing the metallic base material according to claim 1, wherein:

The metallic base material further includes a third area adjacent to the second area with a second boundary portion between the second area and the third area, the third area having a third thickness that is different from the first thickness and second thickness and is constant across the third area; and the method further includes the steps of:

determining the third thickness of the third area at the second boundary portion and determining a difference between the second thickness of the second area and the third thickness of the third area at the second boundary portion, comparing the difference between the second thickness and the third thickness to the machining tolerance of the panel member; and forming a second marking ridge in the second boundary portion when the difference between the second thickness of the second area and the third thickness of the third area at the second boundary portion is less than or equal to the machining tolerance of the panel member, the second marking ridge protruding above the second area and the third area.

9. The method of manufacturing the metallic base material according to claim 8, wherein the panel member forms an outer surface of a wing of the aircraft.

10. The method of manufacturing the metallic base material according to claim 8, wherein a height of the second marking ridge is greater than the machining tolerance.

11. The method of manufacturing the metallic base material according to claim 8, wherein a height of the second marking ridge is a sufficient height necessary to visually confirm the second boundary portion.

12. The method of manufacturing the metallic base material according to claim 8, wherein a height of the first marking ridge is greater than the machining tolerance, and wherein a height of the second marking ridge is greater than the machining tolerance.

13. The method of manufacturing the metallic base material according to claim 8, wherein a height of the first marking ridge is a sufficient height necessary to visually confirm the first boundary portion, and wherein a height of the second marking ridge is a sufficient height necessary to visually confirm the second boundary portion.

14. The method of manufacturing metallic base material according to claim 8, wherein a height of the first marking ridge is greater than the machining tolerance and is a sufficient height necessary to visually confirm the first boundary portion, and wherein a height of the second marking ridge is greater than the machining tolerance and is a sufficient height necessary to visually confirm the second boundary portion.

15. The method of manufacturing the metallic base material according to claim 8, wherein a height of the first marking ridge and a height of the second marking ridge are equal to the machining tolerance.

16. The method of manufacturing the metallic base material according to claim 15, wherein the panel member forms an outer surface of a wing of the aircraft.

17. The method of manufacturing the metallic base material according to claim 1, wherein the first marking ridge defines a boundary of the first area and a boundary of the second area.

18. The method of manufacturing the metallic base material according to claim 8, wherein the second marking ridge defines the boundary of the second area and a boundary of the third area.

19. The method of manufacturing the metallic base material according to claim 8, wherein the second thickness is greater than the third thickness, and the first thickness is greater than the second thickness.

20. A method of manufacturing a metallic base material to form a panel member of an aircraft, the metallic base material comprising:

a first area having a first thickness, a second area adjacent to the first area with a first boundary portion between the first area and the second area, the second area having a second thickness that is different from the first thickness;

a third area adjacent to the first area with a second boundary portion between the first area and the third area, the third area having a third thickness that is different from the first thickness and second thickness and is constant across the third area, the method comprising the steps of:

determining the first thickness of the first area and the second thickness of the second area and determining a difference between the first thickness of the first area and the second thickness of the second area;

determining the third thickness of the third area at the secondary boundary portion and determining a difference between the first thickness of the first area and the third thickness of the third area at the second boundary portion;
comparing the difference between the first thickness and the second thickness to a machining tolerance of the panel member;
comparing the difference between the second thickness and the third thickness to the machining tolerance of the panel member;
forming the first area;
forming the second area;
forming a first marking ridge in the first boundary portion only when the difference between the first thickness of the first area and the second thickness of the second area is less than or equal to the machining tolerance of the panel member, the first marking ridge protruding above the first area and the second area and defining a boundary of the first area and a boundary of the second area; and
forming a second marking ridge in the second boundary portion only when the difference between the first thickness of the first area and the third thickness of the third area at the second boundary portion is less than or equal to the machining tolerance of the panel member, the second marking ridge protruding above the first area and the third area.

* * * * *

UNITED STATES PATENT AND TRADEMARK OFFICE
CERTIFICATE OF CORRECTION

PATENT NO.           : 10,081,418 B2
APPLICATION NO.      : 14/792103
DATED                : September 25, 2018
INVENTOR(S)          : Hideto Motohashi et al.

Page 1 of 1

It is certified that error appears in the above-identified patent and that said Letters Patent is hereby corrected as shown below:

In the Claims

Claim 14, Column 6, Line 20, "manufacturing metallic" should be -- manufacturing the metallic --.

Signed and Sealed this
Eighteenth Day of December, 2018

Andrei Iancu
*Director of the United States Patent and Trademark Office*